(12) United States Patent
Rieck et al.

(10) Patent No.: US 7,469,524 B2
(45) Date of Patent: Dec. 30, 2008

(54) CAST STALK ROLL WITH REDUCED DIAMETER SECTIONS HAVING SPLINES

(75) Inventors: Steven Timothy Rieck, Cambridge, IL (US); Robert Dwane Cobert, Fenton, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/675,720

(22) Filed: Feb. 16, 2007

(65) Prior Publication Data
US 2007/0193241 A1   Aug. 23, 2007

Related U.S. Application Data

(60) Provisional application No. 60/774,551, filed on Feb. 17, 2006.

(51) Int. Cl.
*A01D 45/02* (2006.01)
(52) U.S. Cl. ............................................. 56/104
(58) Field of Classification Search .................. 56/104, 56/56, 52, 60, 94, 114, 500, 66, 59, 105; 460/323, 29, 27, 31
See application file for complete search history.

(56) References Cited

U.S. PATENT DOCUMENTS

| | | | | | |
|---|---|---|---|---|---|
| 1,641,436 | A | * | 9/1927 | Jett | 460/29 |
| 1,682,143 | A | | 8/1928 | Deere | |
| 2,178,013 | A | * | 10/1939 | Blank | 460/27 |
| 2,503,128 | A | * | 4/1950 | Neighbour et al. | 56/50 |
| 2,534,685 | A | * | 12/1950 | Shrader | 460/27 |
| 2,538,965 | A | * | 1/1951 | Fergason | 460/27 |
| 2,678,526 | A | * | 5/1954 | Voss | 56/104 |
| 3,858,384 | A | * | 1/1975 | Maiste et al. | 56/14.2 |
| 5,040,361 | A | * | 8/1991 | Briesemeister | 56/52 |
| 5,282,352 | A | | 2/1994 | Schoolman | |
| 5,404,699 | A | * | 4/1995 | Christensen et al. | 56/104 |
| 6,050,071 | A | * | 4/2000 | Bich et al. | 56/52 |

FOREIGN PATENT DOCUMENTS

EP    1417877 A    5/2004

OTHER PUBLICATIONS

European Search Report dated Apr. 18, 2007, 6 pages.

* cited by examiner

*Primary Examiner*—Árpád Fábián-Kovács

(57) ABSTRACT

A stalk roll for a harvester includes a cast elongate body formed integral with a plurality of elongate cast cutting edges.

7 Claims, 4 Drawing Sheets

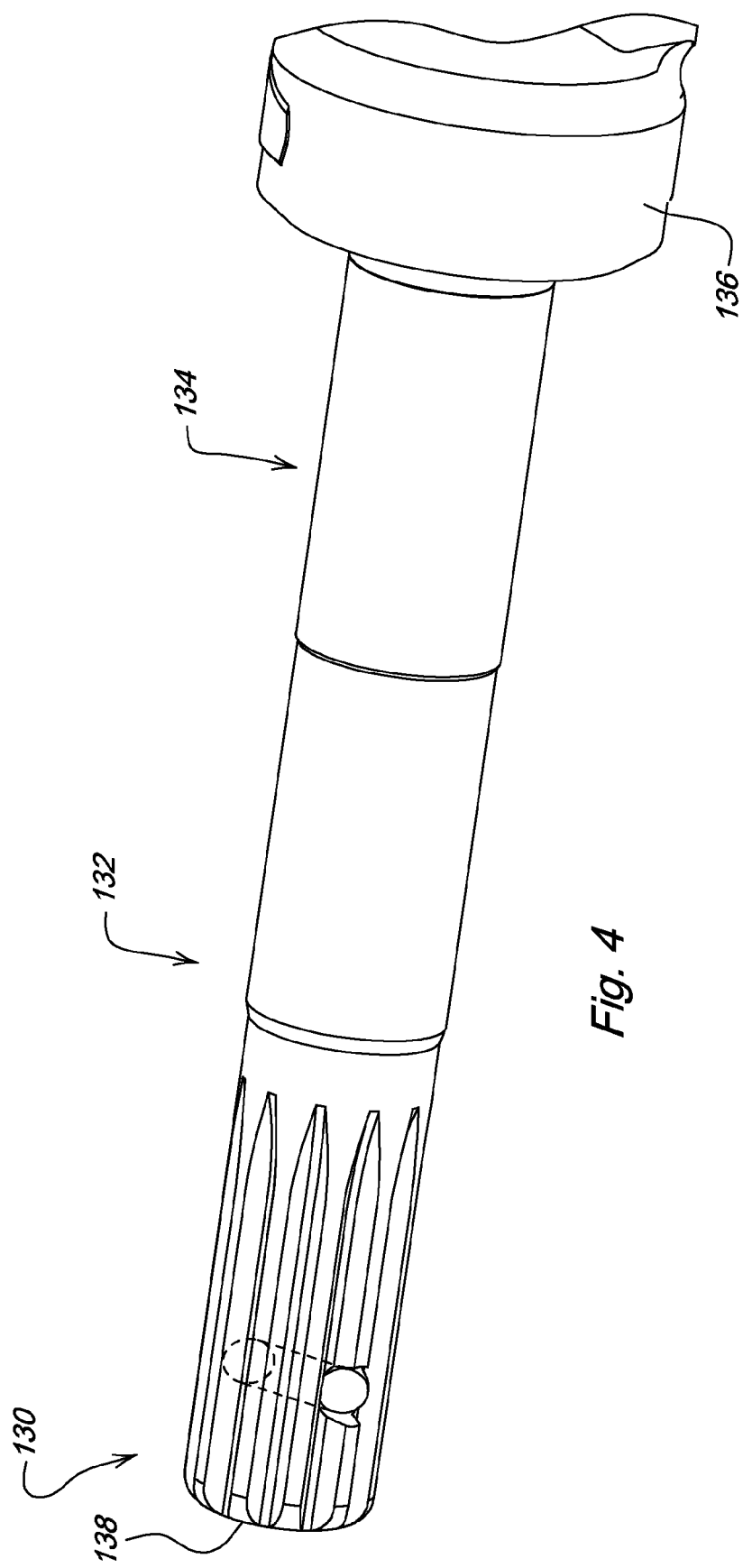

CAST STALK ROLL WITH REDUCED DIAMETER SECTIONS HAVING SPLINES

This application claims priority of Provisional Application 60/774,551 filed on Feb. 17, 2006, and entitled Single Piece Cast Stalk Roll With Eight Opposed Knives Attached To Spline Shaft With Single Roll Pin Retention.

BACKGROUND OF THE INVENTION

Agricultural combines for harvesting corn or maize use devices called row units for separating the ears of corn from the stalk of the plant. Row units are disposed along the leading edge of the harvesting head that is attached to the combine vehicle itself. Row units typically include two forwardly extending rotating stalk rolls that (1) grasp the stalk of the corn plant, (2) pull it downward between them, and (3) pull the stalk loose from each ear of corn.

Stalk rolls have sharpened knife-like edges that extend the length of the stalk rolls to provide a good grip on the stalks of the plant. These edges enable the stalk rolls to grasp and pull the stalk downward. The stalk rolls are mounted on adjacent elongated rotating shafts that extend from the row unit gearbox.

Stalk rolls are typically constructed of several individual elongate components. These components are typically bolted together to form a complete assembly. See, for example, European patent publication EP 0 846 409 B1, in which two adjacent stalk rolls are mounted on two adjacent rotating shafts. Each stalk roll is formed of two half-cylinders that are bolted together with bolts that extend through both the stalk rolls and through the shafts on which the stalk rolls are mounted. The stalk rolls are fixed to the shaft with bolts that transmit torque from the shaft to the stalk roll.

In an alternative arrangement, the body of the stalk roll is made of a single piece of metal to which individual elongated edges are bolted. These edges typically extend the length of the stalk roll body. See, for example French patent publication FR 2784263 in which a central welded roll comprises three elongate plates that are welded together to which three elongate knife blades are bolted.

In another arrangement, the stalk rolls are fixed to the shafts with a tapered coupling and a bolt that is threaded axially into the end of the shaft to compress the tapered couplings together and thus fix the stalk roll to the shaft. See for example, European patent publication EP 0 852 109 B1.

One problem with these arrangements is the cost of manufacture and assembly. Several components must be manufactured and later bolted or welded together to create a stalk roll. Another problem is that the assembled parts can loosen and come apart.

It is an object of this invention to provide a stalk roll formed as a unitary body to thus reduce the cost of manufacture and assembly, it a further object to provide a stalk roll requiring only limited additional machining.

SUMMARY OF THE INVENTION

In accordance with a first aspect of the invention, a stalk roll for a harvester is provided that is configured to be mounted on a row unit drive shaft that rotates to drive the stalk roll, wherein the stalk roll comprises a cast elongate body formed integral with a plurality of elongate cast cutting edges, the cutting edges being oriented generally parallel to the longitudinal axis of the stalk roll and disposed about its periphery.

The cast elongate body has a central axial aperture. This central axial aperture extends substantially the entire length of the body. Within the central axial aperture there are at least two spaced apart reduced diameter sections. A first one of these reduced diameter sections has a plurality of splines that are configured to be supported on and to engage a corresponding splined portion of the row unit drive shaft. A second one of these reduced diameter sections is configured to be supported on a smooth portion of the row unit drive shaft. The second one of these reduced diameter sections also has a major diameter that is larger than the major diameter of the first one of the reduced diameter sections. The cast elongate body has a hole extending to the wall of the cast elongate body and generally perpendicular to the longitudinal axis of the cast elongate body that is configured to receive a pin that extends through the hole and into a corresponding hole in the row unit drive shaft. The reduced diameter sections are provided by a lost foam casting process that forms the inner surface of the stalk roll.

BRIEF DESCRIPTION OF THE DRAWINGS

FIG. 4 is a fragmentary perspective view of the row unit and row unit drive shaft on which the stalk roll is mounted.

DETAILED DESCRIPTION OF THE PREFERRED EMBODIMENT

Figure 1:
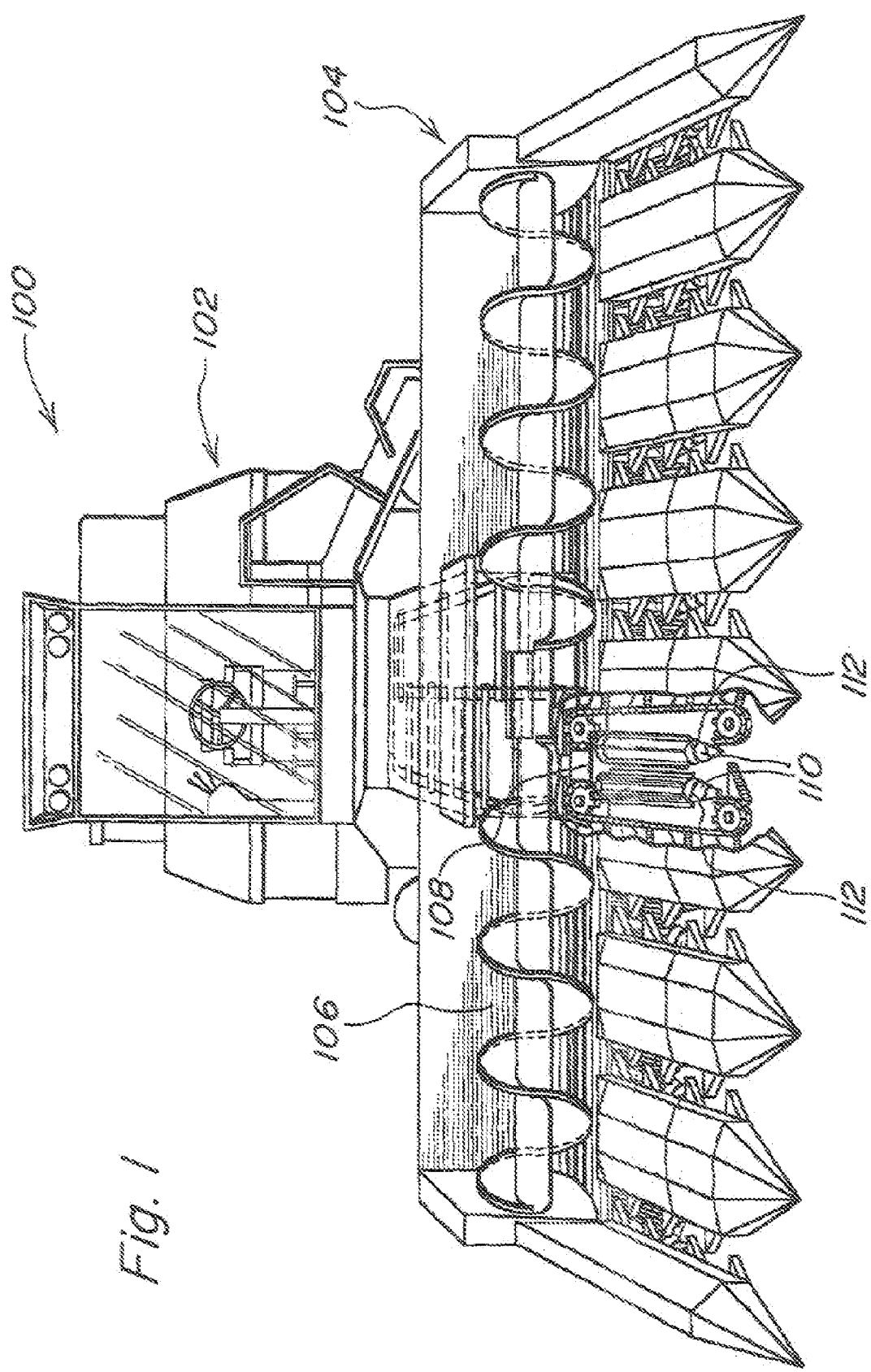
FIG. 1 illustrates an agricultural combine having a corn head with row units comprising stalk rolls in accordance with the present invention.

Referring now to FIG. 1, an agricultural combine 100 comprises a combine vehicle 102 to which a corn head 104 is mounted. The corn head comprises a chassis 106 and a plurality of row units 108 mounted on a chassis 106.

The row units 108 are mounted on the chassis 106 in side to side relationship. They extend across the entire width of the corn head 104. Each row unit 108 has two forwardly extending stalk rolls 110 that extend forward from the corn head 104 in the direction of travel. The stalk rolls are spaced apart to receive corn stalks in the gap defined between the two stalk rolls 110. The forward end of each stalk roll 110 is pointed and has a spiral flute 112 to provide a gradually narrowing gap between adjacent stalk rolls that is configured to receive the stalk of the corn plant.

Figure 2:
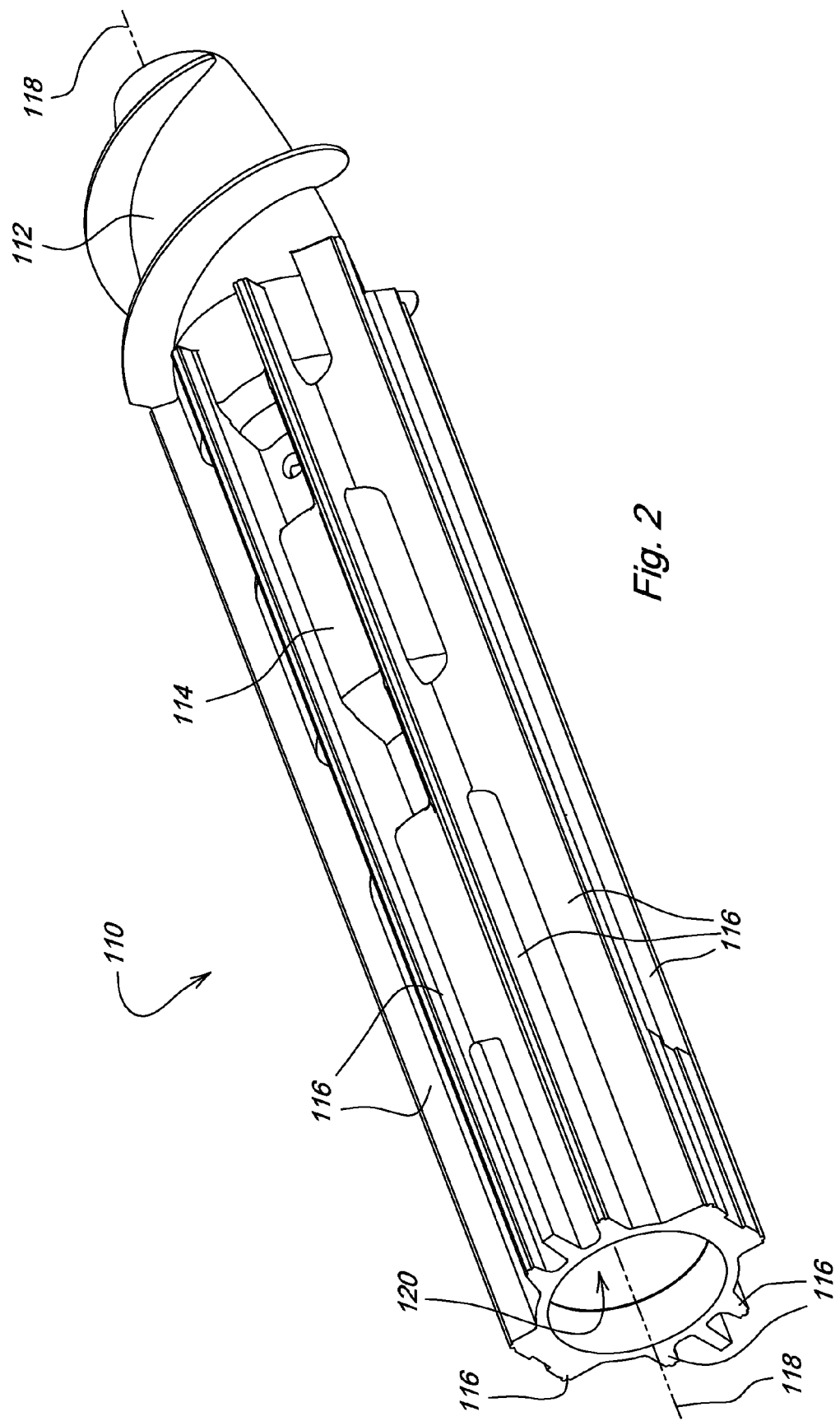
FIG. 2 is a perspective view of one of the stalk rolls of FIG. 1.

Referring now to FIG. 2, an exemplary one of the stalk rolls 110 is shown in perspective view. In this view, the forward end of the stalk roll 110 with spiral flute 112 is shown on the right, and the rear end of the stalk roll 110 is shown on the left.

Stalk roll 110 comprises a cast elongate body 114 including eight elongated cast cutting edges 116 that are oriented generally parallel to and extend outward away from the longitudinal central axis 118 of cast elongate body 114. The elongated cast cutting edges 116 are circumferentially spaced apart about the periphery of cast elongate body 114 and point outward to engage the stalks of corn plants.

A central axial aperture 120 that is coaxial with longitudinal central axis 118 is formed in stalk roll 110. The central axial aperture 120 extends substantially the entire length of the stalk roll and preferably extends entirely through stalk roll 110 as shown herein.

Figure 3:
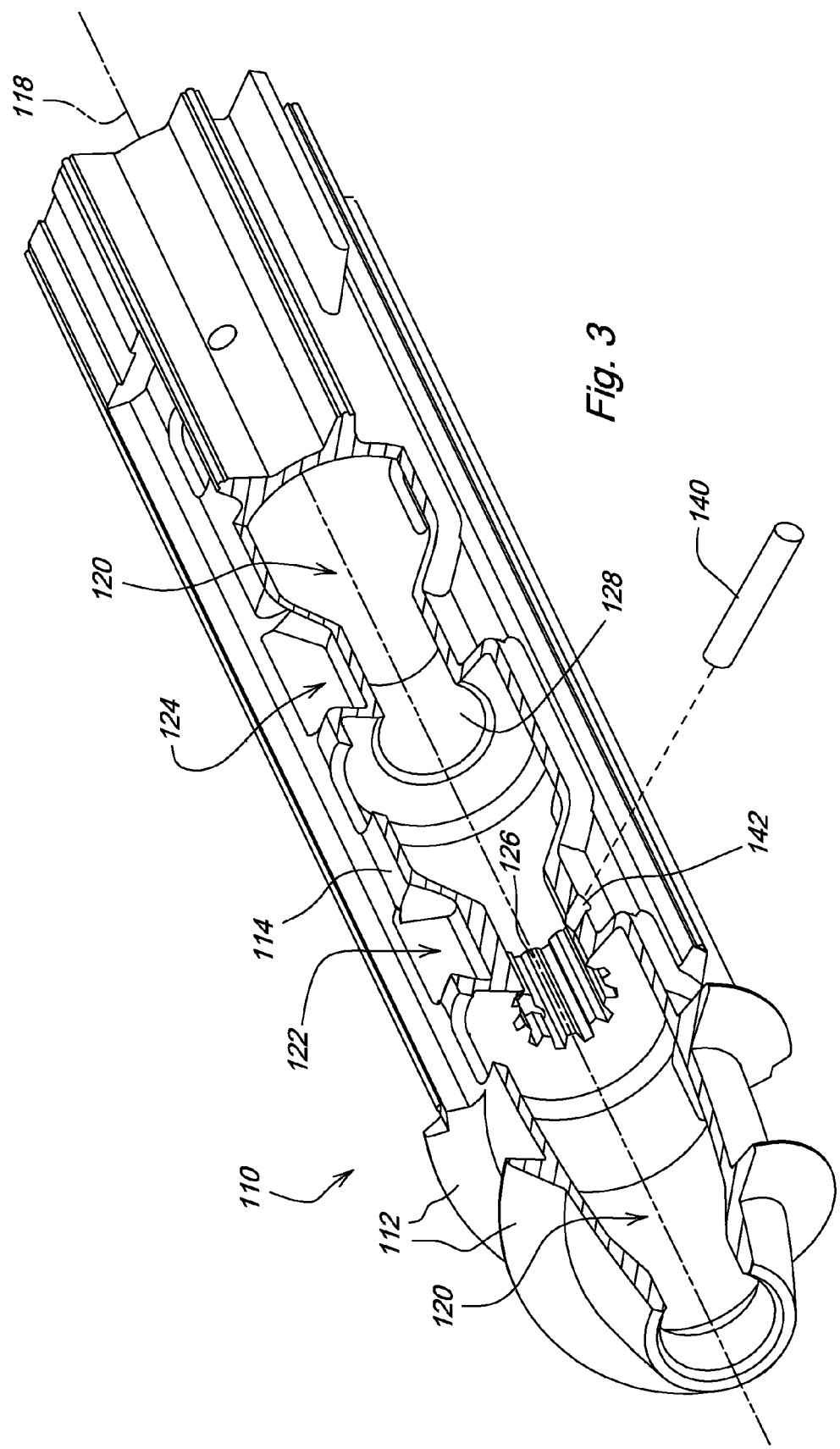
FIG. 3 is a fragmentary cross-sectional view of the stalk roll of FIG. 2 showing the elongate axial aperture and the spaced apart reduced diameter sections of the aperture.

Referring now to FIG. 3, central axial aperture 120 can be seen in greater detail. The central axial aperture 120 has a diameter that is slightly less than the outer diameter of the stalk roll 110, thus providing cast elongate body 114 with a thin, relatively constant wall thickness.

The surface of central axial aperture 120 is a cast surface formed by casting the stalk roll 110 using a "lost foam" casting process. In the lost foam process, a preformed rigid foam body (not shown) having an external surface identical to the internal surface of central axial aperture 120 (with the exception of machined surfaces 126, 128) is disposed inside the mold cavity in which stalk roll 110 is formed. When the mold cavity is filled with molten metal, the entire cast elongate body 114 is formed simultaneously, including spiral flute 112, elongated cast cutting edges 116 and the central axial aperture 120. The rigid foam body (not shown) that is used to create central axial aperture 120 is generally cylindrical, but has two spaced-apart reduced outer diameter portions along the longitudinal axis of the foam body that form reduced diameter sections 122 and 124 of central axial aperture 120.

While the embodiment shown herein has two spaced apart reduced diameter sections 122, 124, it is acceptable to have more reduced diameter sections depending upon the length of the stalk roll 110 and the loads placed upon it. More sections will permit stalk roll 110 to be supported over more of its length.

In the embodiment shown in FIG. 3, 90 degrees of the sidewall of stalk roll 110 has been cutaway, leaving 270 degrees of the reduced diameter sections to be shown in FIG. 3. This is only for ease of illustration, however. No such cutaway section is removed in stalk roll 110 as manufactured. Surfaces 126 and 128 are actually circular and extend 360 degrees around the longitudinal central axis 118.

Once cast elongate body 114 has been molded and the foam core removed, it is then machined: first all of the elongated cast cutting edges 116 are sharpened, then the two reduced diameter sections 122, 124 are machined to provide precision spaced apart mounting surfaces 126, 128 on the inside surfaces of reduced diameter sections 122, 124, and then hole 142 is machined in cast elongate body 114 to receive a roll pin 140. Roll pin 140 extends through row unit drive shaft 132 (FIG. 4) and secures stalk roll 110 on row unit drive shaft 132.

Reduced diameter sections 122, 124 of central axial aperture 120 are machined, typically with a broach or a reamer, to provide spaced apart mounting surfaces 126, 128. Mounting surfaces 126 comprise internal longitudinal splines that are configured to be supported on and engage mating longitudinal splines 130 of row unit drive shaft 132 (FIG. 4) to drive the stalk roll 110 in rotation. Mounting surface 128 is generally smooth and circular to provide radial support for the stalk roll, but not to transmit rotational torque. The fit between mounting surface 128 and row unit drive shaft 132 at smooth cylindrical portion 134 is loose enough to permit the operator to slide stalk roll 110 axially until the splined surfaces engage and roll pin 140 is inserted into hole 142, yet tight enough to prevent undue movement of stalk roll 110 with respect to drive shaft 132 in a radial direction when the stalk roll 110 engages plant stalks during normal operation.

The overall diameter of central axial aperture 120 is 67 mm. Mounting surface 126 has a diameter of 31 mm measured at the root of the splines. Mounting surface 128 has a major diameter of 32 mm. Mounting surface 126 has an axial length of 44 mm and mounting surface 128 has an axial length of 46 mm, slightly larger than the diameter of mounting surface 126. This larger diameter permits the splines of the row unit driveshaft 132 (FIG. 4) to pass through reduced diameter section 124 at mounting surface 128 and engage the splines of mounting surface 126.

Between mounting surfaces 126 and 128, central axial aperture 120 has a diameter of 67 mm and a length of 97 mm. Central axial aperture 120 has a diameter of 67 mm between reduced diameter section 124 and the rear end of stalk roll 110.

Referring now to FIG. 4, row unit 108 includes a row unit gear case 136 from which row unit drive shaft 132 extends. Two row unit drive shafts 132 extends from row unit case 136 in parallel spaced apart relation to support two adjacent stalk rolls 110 as best shown in FIG. 1. Only one of these row unit drive shafts 132 is shown in FIG. 4 for convenience of illustration. Row unit drive shaft 132 is inserted into the rear end of stalk roll 110 with its splined forward end 138 extending through reduced diameter section 124 until external mating splines 130 engage the longitudinal splines on mating surface 126 of reduced diameter section 122. When the splines are interengaged, the smooth cylindrical portion 134 is supported by mounting surface 128 of reduced diameter section 124. At this point, roll pin 140 (FIG. 3) is inserted into hole 142, and into hole 144 where it is secured by spring tension. Roll pin 140 does not transmit torque between row unit drive shaft 132 and stalk roll 110. Torque is transmitted between the two by the splines on the stalk roll and the rotating drive shaft. The function of roll pin 140 is simply to prevent stalk roll 110 from sliding forward and off the forward end 138 of row unit drive shaft 132.

The invention claimed is:

1. A stalk roll for a harvester that is configured to be mounted on a rotatable row unit drive shaft of a row unit is provided, comprising a cast elongate body formed integral with a plurality of elongate cast cutting edges, wherein the elongate cast cutting edges are oriented generally parallel to the longitudinal axis of the stalk roll and are disposed about its periphery, wherein the cast elongate body has a central axial aperture that extends substantially the entire length of the cast elongate body, wherein the central axial aperture includes at least two reduced diameter sections that are axially spaced apart, wherein a mounting surface of a first one of the at least two reduced diameter sections has longitudinal splines on an inner surface thereof that are configured to engage the row unit drive shaft.

2. The stalk roll of claim 1, wherein a mounting surface of a second one of the at least two reduced diameter sections is configured to be supported on a portion of the row unit drive shaft.

3. The stalk roll of claim 1, wherein the cast elongate body includes a hole perpendicular to a longitudinal axis of the cast elongate body and passing through at least one side wall of the cast elongate body at one of the at least two reduced diameter sections.

4. A stalk roll for a harvester that is configured to be mounted on a rotatable row unit drive shaft of a row unit is provided, comprising a cast elongate body formed integral with a plurality of elongate cast cutting edges and formed integral with a cast spiral flute on a pointed forward end of the stalk roll, wherein the elongate cast cutting edges are oriented generally parallel to the longitudinal axis of the stalk roll and are disposed about its periphery, wherein the cast elongate body has a central axial aperture that extends substantially the entire length of the cast elongate body, wherein the central axial aperture includes at least two reduced diameter sections that are axially spaced apart and formed integral with the cast elongate body.

5. The stock roll of claim 4, wherein a mounting surface of a first one of the at least two reduced diameter sections has longitudinal splines on an inner surface thereof that are configured to engage the row unit drive shaft.

6. The stalk roll of claim 4, wherein a mounting surface of a second one of the at least two reduced diameter sections is configured to be supported on a portion of the row unit drive shaft.

7. The stalk roll of claim 4, wherein the cast elongate body includes a hole perpendicular to a longitudinal axis of the cast elongate body and passing through at least one side wall of the cast elongate body at one of the at least two reduced diameter sections.

* * * * *